United States Patent [19]

Dean

[11] 3,760,030

[45] Sept. 18, 1973

[54] MULTIPLE SEQUENCE BLOCK COPOLYMERS OF SILICONES AND STYRENE

[75] Inventor: John William Dean, Averill Park, N.Y.

[73] Assignee: General Electric Company, Waterford, N.Y.

[22] Filed: June 2, 1971

[21] Appl. No.: 149,396

Related U.S. Application Data

[63] Continuation-in-part of Ser. No. 26,082, April 6, 1970.

[52] U.S. Cl. .... 260/827, 260/33.4 SB, 260/33.6 SB, 260/93.5 R, 260/93.5 A, 260/874
[51] Int. Cl..... C08f 33/02, C08f 35/02, C08f 35/06
[58] Field of Search .................................... 260/827

[56] References Cited
UNITED STATES PATENTS

| | | |
|---|---|---|
| 3,678,125 | 7/1972 | Saam et al. .......................... 260/827 |
| 3,678,126 | 7/1972 | Saam et al. .......................... 260/827 |
| 3,051,684 | 8/1962 | Morton et al. ...................... 260/827 |
| 3,187,031 | 6/1965 | Weyenberg ......................... 260/827 |
| 3,483,270 | 12/1969 | Bostick ............................... 260/827 |

FOREIGN PATENTS OR APPLICATIONS

| | | | |
|---|---|---|---|
| 1,915,789 | 10/1969 | Germany ............................. 260/827 |

*Primary Examiner*—Murray Tillman
*Assistant Examiner*—Wilbert J. Briggs, Sr.
*Attorney*—Donald J. Voss and E. Philip Koltos

[57] ABSTRACT

Multiple sequence block copolymers of silicone and styrene having the formula:

(1) $(ABA)_x$ are produced, where A represents repeating diorganosiloxy units and B represents a polystyrene chain. This ABA chain is repeated from three to 10 times. The materials have high elongation and tensile strength and are useful in the formation of strong, elastic films.

13 Claims, No Drawings

MULTIPLE SEQUENCE BLOCK COPOLYMERS OF SILICONES AND STYRENE

This is a continuation-in-part of parent application Ser. No. 26,082 filed on Apr. 6, 1970 now abandoned.

BACKGROUND OF THE INVENTION

Block copolymers of silicones and organic segments have previously been described in the prior art. For example, block copolymers having silicone segments and polystyrene segments are shown in U.S. Pat. No. 3,187,031, issued June 1, 1965. That patent teaches a variety of block copolymers of form AB, ABA and BAB, where A is a chain of repeating diorganosiloxy units and B is a polystyrene chain.

The block copolymers of the prior art were produced, primarily, in order to impart the properties of the silicone segments of the chain to an organic material compatible with the organic portion. Polymers of the form AB, BAB and ABA, provide sufficient compatibility to allow blending of the block copolymer with a compatible organic resin as shown, for example, in my copending application Ser. No. 26,083 filed of even date with application Ser. No. 26,082. However, the single sequence block copolymers, i.e., one wherein, at most, one of the block segments is repeated, do now allow full development of the strength properties of the materials.

SUMMARY OF THE INVENTION

In accordance with the present invention, multiple sequence block copolymers of silicones and organic segments of the formula:

$(ABA)_x$ are prepared where A represents repeating diorganosiloxy units, B represents a polystyrene chain, and $x$ is from three to 10. The preferred polymers of this group are copolymers of polydiorganosiloxy blocks and polystyrene blocks of the formula:

(2)

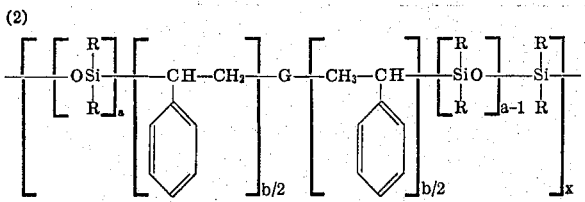

and a copolymer of the formula, (3)

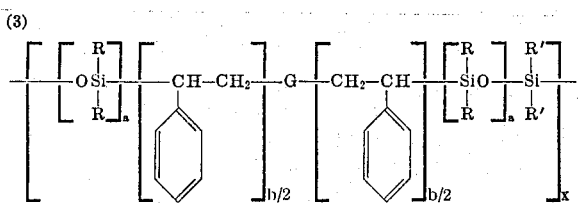

where R is selected from monovalent hydrocarbon radicals free of aliphatic unsaturation, cyanoalkyl radicals and halogenated aryl radicals, R' is a radical selected from alkyl radicals, aryl radicals and aralkyl radicals, G is a divalent radical which is the residue from a dianionic polymerization initiator for styrene, such as the dialkali metal reaction product of naphthalene, 1,1-diphenylethylene, 1-phenylcyclo-hexene, anthracene, benzene, pentane and $a$ varies from 10 to 1,000, $b$ varies from 24 to 1000 and $x$ varies from 3 to 10, where $a$, $b$ and $x$ are whole numbers.

A preferred method for forming the materials of formula (3) is through reaction of a styrene monomer with an organic dilithium compound. Following this reaction, the form polystyrene has lithiated chain terminals. The lithiated polystyrene is then reacted with diorganosiloxy materials, preferably hexaorganocyclotrisiloxane, to produce a single sequence, ABA. This single sequence material also has lithiated terminals and is of the formula:

(4)

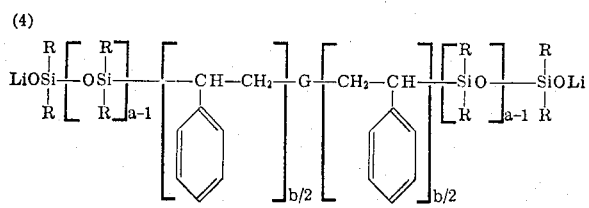

The single sequence block copolymers of formula (4) may then be reacted with a difunctional organosilicon material of the formula $R'_2SiY_2$, where Y is a functional group, the compound being reactive with the lithiated terminal in such a manner that a removable lithium compound is formed with the Y substituent, and the $-SiR_2-$ group is added to the chain. The single sequence block copolymer of formula (4) may also be reacted with acetic anhydride to form the multiple sequence block copolymer of formula (2).

If desired, the chain terminals of the single sequence block copolymer of formula (4) may be converted to silanol by reacting the single sequence copolymer with lithiated chain terminals with an acid, such as acetic acid, to remove the lithium as lithium acetate, and form the silanol terminals. The single sequence ABA block copolymer with silanol terminals can then be reacted with the material of formula $R'_2SiY_2$, as previously described, to form the multi-sequence block copolymer. The single sequence ABA block copolymer having silanol terminals can also be reacted with a polydiorganosiloxy material having silicon hydride chain terminals, through procedures which are well known for room temperatures vulcanizing compositions of this type.

The materials of formula (1) can be solvent cast into strong, elastic films which are not chemically cross-linked.

DESCRIPTION OF THE PREFERRED EMBODIMENTS

In accordance with the present invention, an organic monomer such as styrene is reacted with a dianionic alkali metal initiator for styrene so as to form an organic polymer having, for instance, lithiated chain terminals of the formula:

(5)

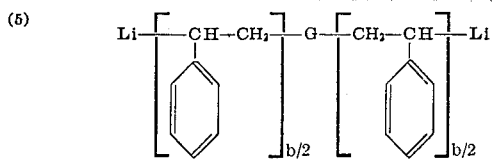

The dianionic metal initiator compounds which may be employed in this reaction include elemental lithium. Preferably, however, the lithium is employed as an organic lithium compound including such materials as dilithium naphthalene, dilithium anthracene, 1,4-dilithium benzene, 1,5-dilithium pentane, 1,5-dilithium naphthalene, dilithium-1,1-dipheny/ethylene, dilithium-1,phenyl cyclohexene, etc. Alkali metals such as the sodium and postassium forms of the above compounds may also be used as catalysts. The amounts of alkali metal catalyst or initiator necessary is generally from about 0.000001 to 0.3 mole of the alkali metal for each mole of the organic monomer, such as styrene.

The reaction of the organic monomer, such as styrene, with the dianoinic alkali metal initiator material is generally carried out in a solvent. Useful solvents include tetrahydrofuran, mixtures of tetrahydrofuran and toluene containing at least 20% tetrahydrofuran, other ethers such as glyme and diglyme, and other aromatic hydrocarbons which are otherwise inert to the reaction. The preferred solvent is tetrahydrofuran or mixtures of tetrahydrofuran and toluene. Purifications of product materials is more difficult when other ethers are used. This intial reaction generally requires several hours at 0° C, at least when employing styrene.

Following preparation of the dilithiated organic polymer of formula (5), terminal organosilicon blocks are formed by reacting the lithiated organic polymer with a polydiorganosiloxy material, preferably a hexaorganocyclotrisiloxane, such as hexamethylcyclotrisiloxane, hexaphenylcyclotrisiloxane, 1,3,5-trimethyl-1,3,5-beta-cyanoethyl-cyclotrisiloxane, etc. to obtain the polymer of formula (4). Other cyclic, organosubstituted siloxanes can also be employed but reaction proceeds most easily with the hexaorganocyclotrisiloxanes.

The organosiloxane material which is employed in this reaction will, of course, determine the R substituents on the polydiorganosiloxy blocks. Among the members which R can represent and, thus, the substituents possible on the cyclic organosiloxane reactants are alkyl radicals such as methyl, ethyl, propyl, isobutyl, hexyl, octyl, etc; aryl radicals, such as phenyl, naphthyl, biphenyl, etc; aralkyl radicals such as benzyl, phenethyl, etc; alkaryl radicals such as tolyl, xylyl, ethylphenyl, etc; halogenated aryl radicals such as chlorophenyl, tetrachlorophenyl, chloronaphthyl, tetrafluorophenyl, etc; and cyanoalkyl radicals such as beta-cyanoethyl, gamma-cyanopropyl, gamma-cyanobutyl, etc.

The reaction of the dilithiated organic polymer and the diorganosiloxy material is carried out in the same solvent in which the organic monomer was reacted with the dilithium catalyst. The reaction, particularly employing the hexaorganocyclotrisiloxane, generally requires from about 2 to 4 hours at about 60° C.

The material which results from the reaction of the organosiloxane material with the dilithiated organic polymer is a single sequence, ABA block copolymer, having a central organic polymer block and terminal polydiorganosiloxy blocks which are, respectively, terminated with lithium as shown in formula (4).

Formation of the multiple sequence silicone-organic block copolymer can proceed directly employing this single sequence material, without purification, or the single sequence material may be reacted with an acid, such as acetic acid, to produce a single sequence ABA block copolymer having silanol chain terminals. Similarly, the material with the silanol chain terminals can be allowed to remain in the solvent and reacted to form the multiple sequence material, as explained below, or it may be purified and subsequently reacted with a polydiorganosiloxy unit of desired length having silicon hydride chain terminals according to reaction procedures which are well known for room temperature vulcanizing organopolysiloxanes.

Employing an in situ reaction, either of the lithiated, single sequence ABA block copolymer or of the single sequence ABA block copolymers with silanol chain terminals, a difunctional organosilane of formula $R'_2SiY_2$ can be employed, where $R'$ is as previously defined, to form the polymer of formula (3). The substituents represented by Y are groups which are reactive with the alkali metal or which will remove the hydroxyl terminal, without affecting the remainder of the block copolymer. Included among these groups are acyloxy groups, such as acetoxy, halogen substituents such as chloro and aminoxy substituents. Specific materials which can be so employed include diphenyl diacetoxysilane, dimethyldiacetoxysilane, dimethyldichlorosilane, etc. This reaction proceeds relatively quickly under standard conditions.

With silanol chain terminals, the product can be removed from the reaction mixture and subsequently reacted with another material in order to provide the multiple sequence block copolymer of silicone and organic components. For example, the purified, silanol chain-terminated single sequence block copolymer can be treated with a silanol condensation agent such as stannous octoate, or other organic metal salts which condense silanol units, either to directly couple to other single sequence or short chain multiple sequence ABA block copolymers having other than silanol chain terminals or with acyloxy or hydride-terminated polydiorganosiloxanes which may have chain lengths of up to 500, 1,000, or even more siloxy groups. In this manner, a room temperature vulcanizing multiple sequence block copolymer can be formed and employed.

Further, the dilithiated, single sequence block copolymer can be coupled to form the multiple sequence block copolymer of formula (2) through treatment with an acid anhydride, such as acetic anhydride, as explained before. This reagent, added to the reaction mixture at 50° – 60° C acts to remove the lithium chain terminals and bond the siloxy groups from which the lithium has been removed.

If desired, following formation of the multiple sequence block copolymer, the silanol chain terminals can be converted to other polysiloxane chain terminals by means known in the art.

In order that those skilled in the art may be better enabled to practice the process of the present invention, the following examples are given by way of illustration and not by way of limitation. All parts in these examples are by weight.

Example 1

The initial polymerization of the organic segment, followed by reaction with the diorganosiloxy material, was carried out under a dry nitrogen atmosphere in cleaned equipment. Oxygen, water and other reactive contaminants were excluded by purification of solvents and reactants. The solvents were purified by distillation, the toluene from sodium and the tetrahydrofuran from sodium naphthalene. The hexamethylcyclotrisiloxane reactant was resublimated under reduced pressure, while the styrene reactant was redistilled under reduced pressure from calcium hydride.

A quantity of 260 parts toluene and 180 parts of tetrahydrofuran were charged to the reaction vessel and 2.5 millimoles of dilithium naphthalene were added. The dilithium naphthalene was added as a 0.35 molar solution in tetrahydrofuran. The mixture was cooled with an ice-water mixture and 5.5 parts of styrene were added. AFter 1 hour, an additional 45 parts of styrene were added, in small portions, over the course of 1 hour. The solution became dark red and was kept at the low, ice temperature for an additional hour. A portion of a solution or 75 parts hexamethylcyclotrisiloxane, in a mixture of 65 parts toluene and 65 parts of tetrahydrofuran, was then added to the original reaction mixture. The mixture soon gelled, after which the ice water mixture was removed and the contents of the vessel heated to 60° C. The remainder of the hexamethylcyclotrisiloxane was added in small portions over the course of 3 hours to the slowly stirred viscous mass which had become colorless. Stirring was continued for 2 hours after completion of the addition of the hexamethylcyclotrisiloxane solution and 0.4 part acetic anhydride was added. The mixture was stirred for an additional hour and was then allowed to cool overnight.

The resulting product was diluted with additional toluene and was then precipitated into 4 volumes of methanol. The resulting product was a rubbery, white crumb and was obtained in a yield of 88 parts. The intrinsic viscosity of the material, measured in toluene at 25° C, was 0.48 dl/g. This material had a formula equivalent to formula (2), where $a$ is 200, $b$ is 200, and $x$ is greater than 2.

The polymer obtained was dissolved in various solvents and films were cast from these solvents. After evaporation of the solvent, 2 inch dumbbells were cut from the films in order to measure the strength properties of the material. The properties of these films, as determined by the dumbbell measurements, are as follows, indicating the solvent employed for casting of each:

TABLE I

| Casting Solvent | Tensile Strength (psi) | Elongation % |
|---|---|---|
| n-hexane | 512 | 375 |
| 10% methylethyl ketone-90% n-hexane | 1,015 | 500 |
| 13% methylene chloride-87% n-hexane | 951 | 500 |

Example 2

A single sequence styrene-organopolysiloxane block copolymer was formed in the same manner as in Example 1, through the reaction of styrene with dilithium naphthalene, followed by reaction with hexamethylcyclotrisiloxane. The amounts employed were such as to form a material equivalent to formula (2) where $a$ was 100, $b$ was 50, and $x$ was 1, and the block copolymer was terminated with hydroxy groups. After recovery of the silanol-terminated single sequence block copolymer, a quantity of 100 parts of the copolymer was reacted with 1 part of a 2 molar solution of $[(CH_3)_2CHNH]_2SI(CH_3)_2$ in toluene. The copolymer had been previously dissolved in 85 parts of toluene and was stirred while the amine was slowly added to it. The mixture was refluxed for a period of 2 hours and reaction was then stopped by addition of acetic acid. The polymer was filtered from the solution and the remaining solvent was then stripped. The resulting product was a rubbery, yellow mass which could be cast to a film from a toluene solution.

Example 3

Into a reaction vessel were placed 170 parts of toluene and 45 parts of tetrahydrofuran. To this solvent mixture was added 2.5 millimoles of dilithium naphthalene in the form of a tetrahydrofuran solution. A small amount of styrene was added to seed the catalyst and, after 15 minutes, an additional 25 parts of styrene were added over the course of an hour. The solution was initially dark red but became a clear red by the end of the styrene solution addition. A solution of 74 parts of hexamethylcyclotrisiloxane in a mixture of 65 parts tetrahydrofuran and 65 parts of toluene was then added to the polystyrene solution with gelation of the solution occurring after about 1/5 of the hexamethylcyclotrisiloxane solution had been added. Addition of the hexamethylcyclotrisiloxane solution was continued over the course of 1 ½ to 2 hours while the reaction mixture temperature was raised to 50° – 60° C. A quantity of 0.3 part of acetic anhydride was added, incrementally, over a period of 10 minutes. The solution was diluted with methylene chloride and precipitated into 2,400 parts of methanol. The white, rubbery crumb was dried at 60° C in hot air and provided an 84 percent yield, based on the theoretical. The material could be cast into a film which was elastic and stronger than the corresponding film formed from the single sequence ABA block copolymer. The structure of this material was equivalent to formula (2) where $a$ is 200, $b$ is 100 and $x$ is greater than 2. In intrinsic viscosity of the material was 0.48.

EXAMPLE 3

In the same manner as in Example 1, a multiple sequence copolymer was prepared having the structure of formula (2), where $a$ is 400, $b$ is 100 and $x$ is greater than 2. A solution of this material was formed in a mixture of 87% n-hexane and 13% methylene chloride. The material could be drawn with an extension of about 110 percent. On relaxing, the extension was approvimately 95 to 100 percent. On heating at 74° C, the material shrank further to about a 55 percent extension.

EXAMPLE 4

Proceeding in the same manner as in Example 2, a block copolymer was formed having a structure equivalent to that of formula (2) where $a$ was 400, $b$ was 200 and $x$ was 2. The intrinsic viscosity of this material was 0.73 and a rubbery sheet could be cast from a solution of hexane containing 9 percent methylene chloride.

EXAMPLE 5

In the same manner as in Example 2, a multiple sequence block copolymer was formed corresponding to formula (2) where $a$ was 200, $b$ was 200 and $x$ was approximately 3. The material had an intrinsic viscosity of 0.75 dl/g measured in toluene at 25° C. The increased chain length was accomplished through slower addition of the acetic anhydride in the coupling reaction.

Films were cast from a hexane solution of this material, the hexane containing 10% ethyl acetate. The tensile strength of the film was 1,200 psi and the elongation 235 percent. The film could be cold drawn. Similar films cast from toluene showed a tensile strength of 970 psi and an elongation of 210 percent, while films cast from hexane with 10 percent methylethyl ketone had a tensile strength of 1,250 psi with an elongation of 290 percent.

EXAMPLE 6

Employing the same techniques as in Example 2 and using the phenyl diacetoxysilane coupling agent, a multiple sequence block copolymer having a composition equivalent to formula (2) was formed. In the copolymer relative to formula (2), $a$ was 25, $b$ was 50 and $x$ was approximately 10. The intrinsic viscosity of the material was 0.19 dl/g in toluene and 0.16 dl/g in methylethyl ketone.

As the solvent cast films formed from the materials of the present invention are not chemically cross-linked, their strength must be otherwise derived, and it is believed, without wishing to be bound by theory, that this strength is obtained through "physical" cross-linking. The "physical" cross-linking is believed to be obtained through aggregation of the glassy, organic polymer blocks of adjacent chains into domains, thus establishing a network of tie points between the polymer chains, with the connecting links between these domains being the polysiloxane chain segment. The range of properties of the block copolymers according to the present invention can be varied from stiff and inelastic to soft and rubbery, depending upon the relative organic and polysiloxane contents.

I claim:

1. A multiple sequence, block copolymer of polystyrene and polydiorganosiloxane of the formula,

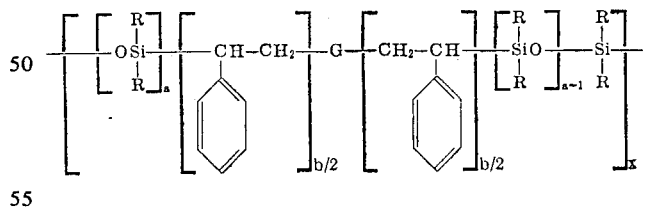

where G is the residue of a dianionic initiator for styrene, which are dialkali metal reaction products of compounds selected from the class consisting of naphthalene, diphenylethylene, 1-phenylcyclohexene, anthracene, benzene and pentane, R is selected from the class consisting of monovalent hydrocarbon radicals free of aliphatic unsaturation, aryl radicals and cyanoalkyl radicals, $a$ varies from 10 to 1,000, $b$ varies from 24 to 1,000 and $x$ varies from three to 10, where $a$, $b$ and $x$ are whole numbers.

2. The multiple sequence, block copolymer of claim 1 wherein $a$ is from 25 to 500, $b$ is from 50 to 500 and $x$ is from three to 10.

3. The multiple sequence, block copolymer of claim 1 wherein R is methyl.

4. The multiple sequence, block copolymer of claim 1 wherein R is phenyl.

5. A film formed from the multiple sequence, block copolymer of claim 2.

6. A multiple sequence, block copolymer of polystyrene and polydiorganosiloxane of the formula,

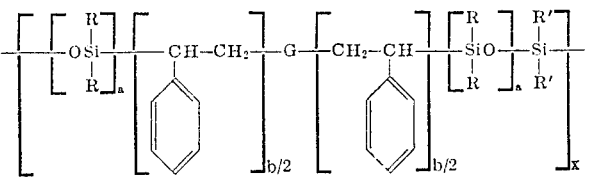

where G is the residue of a dianionic initiator for styrene, which are dialkali metal reaction products of compounds selected from the class consisting of naphthalene, diphenylethylene, 1-phenylcyclohexene, anthracene, benzene and pentane, R is selected from the class consisting of monovalent hydrocarbon radicals free of aliphatic unsaturation, aryl radicals and cyanoalkyl radicals, R' is a radical selected from alkyl radicals, aryl radicals and aralkyl radicals, $a$ varies from 10 to 1,000, $b$ varies from 24 to 1,000 and $x$ varies from three to 10, where $a$, $b$ and $x$ are whole numbers.

7. The multiple sequence, block copolymer of claim 6 wherein $a$ is from 25 to 500, $b$ is from 50 to 500 and $x$ is from three to 10.

8. The multiple sequence, block copolymer of claim 6 wherein R is methyl and R' is phenyl.

9. A film formed from the multiple sequence, block copolymer of claim 6.

10. A process for forming a polymer of the formula,

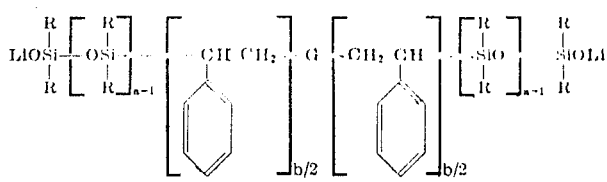

comprising reacting a compound of the formula, with acetic anhydride, where G is the residue of a dianionic lithium initiator for styrene, which is a reaction product of lithium and compounds selected from the class consisting of naphthalene, diphenylethylene, 1-phenylcyclohexene, anthracene, benzene and pentane, R is selected from the class consisting of monovalent hydrocarbon radicals free of aliphatic unsaturation, aryl radicals and cyanoalkyl radicals, $a$ varies from 10 to 1,000, $b$ varies from 24 to 1,000 and $x$ varies from three to 10, where $a$, $b$ and $x$ are whole numbers.

11. The process of claim 10 wherein R is methyl.

12. A process for forming a polymer of the formula,

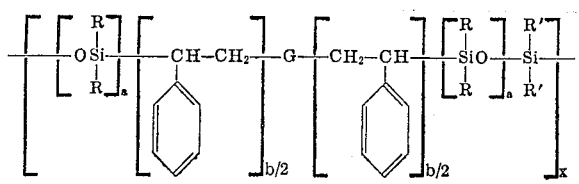

by reacting a compound of the formula,

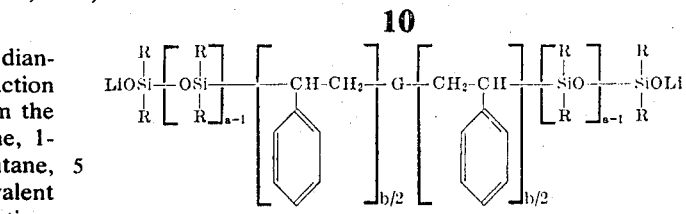

with a compound of the formula, $$R'_2SiX_2$$

where G is the residue of a dianionic lithium initiator for styrene, which is a dilithium reaction product of lithium and compounds selected from the class consisting of naphthalene, diphenylethylene, 1-phenylcyclohexene, anthracene, benzene and pentane, R is selected from the class consisting of monovalent hydrocarbon radicals free of aliphatic unsaturation, aryl radicals and cyanoalkyl radicals, R' is a radical selected from alkyl radicals, aryl radicals and aralkyl radicals, X is selected from acyloxy radicals, alkoxy radicals, aminoxy radicals and halogen radicals, $a$ varies from 10 to 1,000, $b$ varies from 24 to 1,000 and X varies from three to 10, where $a$, $b$ and X are whole numbers.

13. The process of claim 12 wherein R is methyl and R' is phenyl.

* * * * *